United States Patent
Yokoi

(10) Patent No.: US 11,099,538 B2
(45) Date of Patent: Aug. 24, 2021

(54) ANALYSIS SYSTEM, CONTROLLER, AND DATA PROCESSING DEVICE

(71) Applicant: Shimadzu Corporation, Kyoto (JP)

(72) Inventor: Yusuke Yokoi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 168 days.

(21) Appl. No.: 16/611,325

(22) PCT Filed: Jun. 8, 2017

(86) PCT No.: PCT/JP2017/021343
§ 371 (c)(1),
(2) Date: Nov. 6, 2019

(87) PCT Pub. No.: WO2018/225222
PCT Pub. Date: Dec. 13, 2018

(65) Prior Publication Data
US 2020/0166901 A1 May 28, 2020

(51) Int. Cl.
*G05B 19/042* (2006.01)
*G01N 35/00* (2006.01)

(52) U.S. Cl.
CPC ..... *G05B 19/042* (2013.01); *G01N 35/00732* (2013.01); *G01N 2035/00792* (2013.01);
(Continued)

(58) Field of Classification Search
CPC .. G01N 30/02; G01N 35/00732; G01N 30/86; G01N 2035/00811;
(Continued)

(56) References Cited

U.S. PATENT DOCUMENTS 8,065,564 B2 * 11/2011 Nakatani ............... G06F 11/165
714/37
2006/0174155 A1 * 8/2006 Mansell .............. G06F 11/3696
714/5.11
(Continued)

FOREIGN PATENT DOCUMENTS

JP 2007-024560 A 2/2007

OTHER PUBLICATIONS

International Search Report dated Sep. 5, 2017 in corresponding International application No. PCT/JP2017/021343; 4 pages.
(Continued)

*Primary Examiner* — Shogo Sasaki
(74) *Attorney, Agent, or Firm* — Maier & Maier, PLLC

(57) ABSTRACT

An analysis system, controller, and data processing device that are capable of avoiding the influence on control in the case where the names of the constituent elements are changed. The analysis system includes a plurality of constituent elements used for analysis; a controller configured to perform control on a basis of data received from the constituent elements; and a data processing device configured to process data received from the controller. The controller receives the control code, the additional code, and the name information from the plurality of constituent elements to generate an ID code on the basis of the control code and the additional code. The data processing device receives the ID code and the name information from the controller, and performs control on the basis of the control code included in the ID code.

4 Claims, 4 Drawing Sheets

(52) U.S. Cl.
CPC .............. *G01N 2035/00851* (2013.01); *G05B 2219/33204* (2013.01)

(58) Field of Classification Search
CPC .......... G01N 2035/00851; G01N 2035/00792; G05B 2219/33204; G05B 19/042; G05B 19/0426
See application file for complete search history.

(56) References Cited

U.S. PATENT DOCUMENTS

| | | | | |
|---|---|---|---|---|
| 2011/0289374 A1* | 11/2011 | Suzuki | ............. | G01N 35/00732 714/748 |
| 2012/0030504 A1* | 2/2012 | Nishiyama | .......... | G06F 11/2046 714/4.11 |

OTHER PUBLICATIONS

Written Opinion of the International Searching Authority dated Sep. 5, 2017 in corresponding International application No. PCT/JP2017/021343; 8 pages including Partial Machine-generated English-language translation.

\* cited by examiner

Fig. 2

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
| CONTROL CODE (12bit) ||||||||||||  ADDITIONAL CODE (4bit) ||||
| ID CODE (16bit) ||||||||||||||||

ANALYSIS SYSTEM, CONTROLLER, AND DATA PROCESSING DEVICE

TECHNICAL FIELD

The present disclosure relates to an analysis system including a plurality of constituent elements used for analysis, a controller for performing control on the basis of data received from the plurality of constituent elements, and a data processing device for processing data received from the controller, and the controller as well as the data processing device used in the analysis system.

BACKGROUND ART

Various types of analysis devices, for example, a liquid chromatograph and a gas chromatograph, perform analysis by using a plurality of constituent elements (analytical units) including an autosampler, a column oven, and a detector. The constituent elements are correlated with individual device IDs and model name IDs (refer to Patent Document 1 below, for example).

An analysis device is provided with a controller for controlling constituent elements. The controller performs control on the basis of device IDs received from the constituent elements. The controller stores, therein, a table in which the device IDs of the constituent elements are correlated with model name IDs thereof. The controller acquires, on the basis of a device ID received from each of the constituent elements, a model name ID corresponding to the device ID from the table, and identifies, on the basis of the model name ID, the name of each of the constituent elements.

As a data processing device for analyzing data, for example, a chromatography data system (CDS) is connected to the controller. The CDS performs control on the basis of the device IDs of the constituent elements received through the controller. As with the controller, the CDS also stores, therein, a table in which the device IDs of the constituent elements are correlated with the model name IDs thereof. The CDS acquires, on the basis of a device ID of each of the constituent elements received through the controller, a model name ID corresponding to the device ID from the table, and identifies, on the basis of the model name ID, the name of each of the constituent elements.

As described above, for control, the device ID is separated from the name (model name ID) of each of the constituent elements, and the device ID is used to perform control in the controller and the data processing device. This can avoid the influence on control for the case where the names of the constituent elements are changed, for example.

PRIOR ART DOCUMENTS

Patent Document

Patent Document 1: JP 2007-024560 A

SUMMARY

However, in some CDSs, device IDs and model name IDs are uniquely determined. In such a case, in order to change the names of the constituent elements in the CDS, it is necessary to use different device IDs and model name IDs. This sometimes affects control, for example, requires changing a device ID in firmware.

The present invention has been achieved in light of the foregoing situations, and therefore, an object of the present invention is to provide an analysis system, controller, and data processing device that are capable of avoiding the influence on control in the case where the names of the constituent elements are changed.

(1) An analysis system according to the present invention includes a plurality of constituent elements used for analysis, a controller configured to perform control on a basis of data received from the constituent elements, and a data processing device configured to process data received from the controller.

Each of the constituent elements includes a storage unit. The storage unit stores a control code used for control, an additional code to be assigned to the constituent element, and name information indicating a name of the constituent element.

The controller includes a first receiving unit, a first control unit, and an ID code generation unit. The first receiving unit receives the control code, the additional code, and the name information from each of the constituent elements. The first control unit performs control on a basis of the control code received by the first receiving unit. The ID code generation unit generates an ID code on a basis of the control code and the additional code received by the first receiving unit.

The data processing device includes a second receiving unit and a second control unit. The second receiving unit receives the ID code and the name information from the controller. The second control unit performs control on a basis of the control code included in the ID code received by the second receiving unit.

According to such a configuration, the controller receives the control code from each of the constituent elements, and performs control on the basis of the control code. The data processing device receives the ID code from the controller, and performs control on a basis of the control code included in the ID code. This enables control in the controller and the data processing device with the control code separated from the name of each of the constituent elements. This reduces the influence on control in the case where the names of the constituent elements are changed.

If the constituent elements have different additional codes from one another, the ID codes can be different for each constituent element. In such a case, depending on data processing devices, each of the constituent elements is identifiable on the basis of the ID code received from the controller. Since the name information indicating the names of the constituent elements is received by the data processing device through the controller, depending on data processing devices, each of the constituent elements is identifiable on the basis of the name information.

(2) The second control unit may identify a name of the constituent element on a basis of the name information received from the controller.

According to such a configuration, the data processing device receives the name information indicating the names of the constituent elements from the controller, so that the name of each of the constituent elements can be identified on the basis of the name information. In such a case, the data processing device can identify the names of the constituent elements without using the ID code received from the controller.

(3) The second control unit may identify a name of the constituent element on the basis of the ID code received from the controller.

According to such a configuration, the data processing device receives the ID code generated in the controller from the controller, so that the name of each of the constituent elements can be identified on the basis of the ID code. In such a case, the data processing device may store the name information on the constituent elements correlated with the individual ID codes.

(4) The name information may be text data.

(5) A controller according to the present invention is a controller for performing control on a basis of data received from a plurality of constituent elements used for analysis, the controller including a first receiving unit, a first control unit, and an ID code generation unit. The first receiving unit receives, from each of the constituent elements, a control code used for control, an additional code to be assigned to the constituent element, and name information indicating a name of the subject constituent element. The first control unit performs control on a basis of the control code received by the first receiving unit. The ID code generation unit generates an ID code on a basis of the control code and the additional code received by the first receiving unit.

(6) A data processing device according to the present invention is a data processing device for processing data received from the controller, the data processing device including a second receiving unit and a second control unit. The second receiving unit receives the ID code and the name information from the controller. The second control unit performs control on a basis of the control code included in the ID code received by the second receiving unit.

According to the present invention, control in the controller and the data processing device can be performed with the control code separated from the name of each of the constituent elements. This reduces the influence on control in the case where the names of the constituent elements are changed.

BRIEF DESCRIPTION OF THE DRAWINGS

FIG. 2 is a diagram illustrating a specific example of an ID code.

DETAILED DESCRIPTION

1. Example of Configuration of Analysis System

Figure 1:
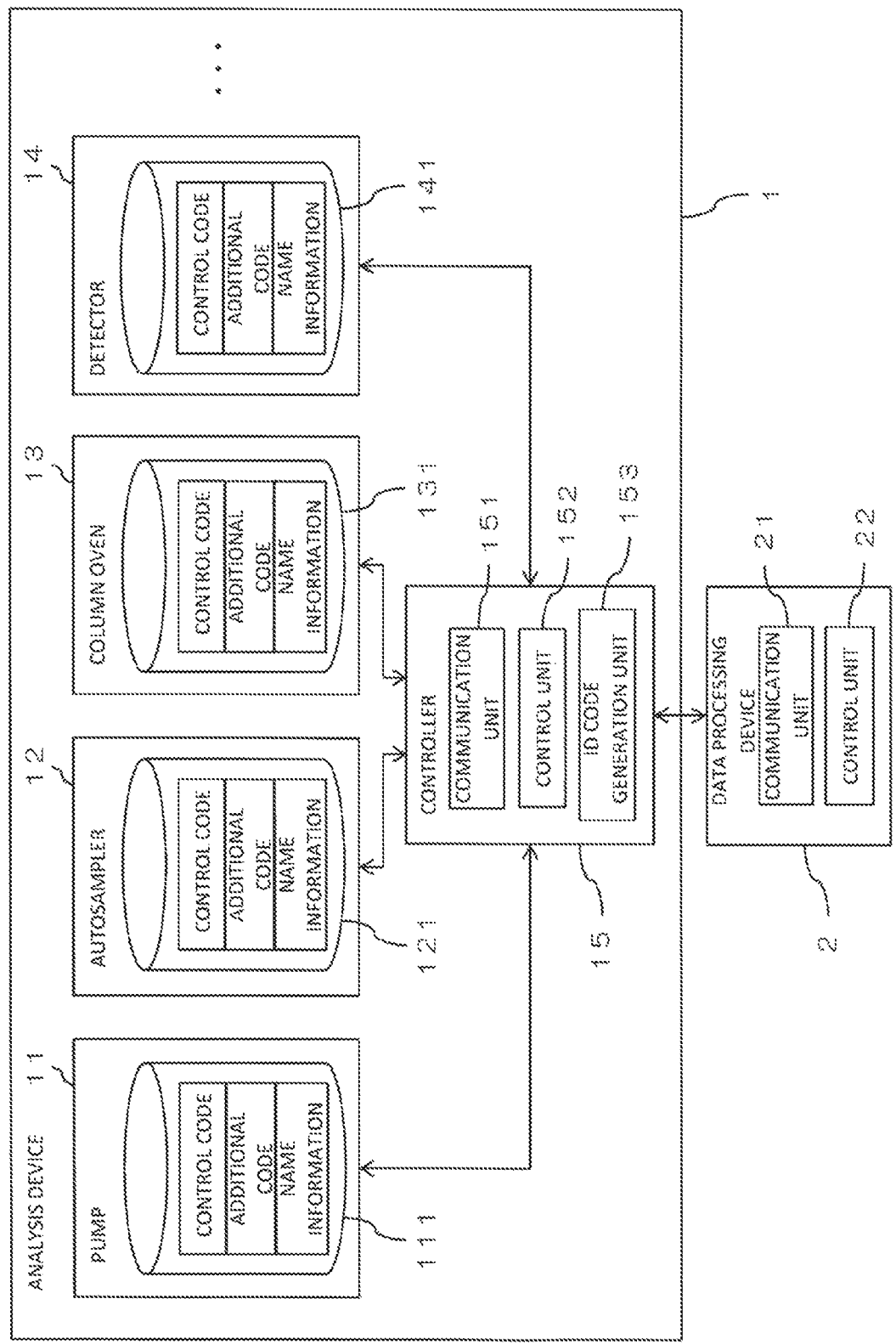
FIG. 1 is a block diagram illustrating an example of the configuration of an analysis system according to an embodiment of the present invention.

FIG. 1 is a block diagram illustrating an example of the configuration of an analysis system according to an embodiment of the present invention. The analysis system includes an analysis device 1 and a data processing device 2, for example. In this embodiment, a case is described in which the analysis device 1 is a liquid chromatograph.

The analysis device 1 is provided with various analytical units such as a pump 11, an autosampler 12, a column oven 13, and a detector 14. The analytical units 11, 12, 13, and 14 are constituent elements used in the analysis device 1 for analysis. The constituent elements may be functional units, on a per-function basis, which have a plurality of components. Alternatively, the constituent elements may be components such as a valve, cell, or column provided in each of the functional units. Stated differently, the constituent element may be a single component or a group of components, provided that the constituent element is used for analysis.

The analytical units 11, 12, 13, and 14 include storage units 111, 121, 131, and 141 for storing various kinds of data, respectively. Each of the storage units 111, 121, 131, and 141 stores, therein, a control code, an additional code, name information, and so on.

The control code is so set as to be correlated with the analytical units 11, 12, 13, and 14 as a code used for the case where the analysis device 1 is controlled. The control code is used in a control program executed at the time of analysis. The additional code is different for each of the analytical units 11, 12, 13, and 14, and is assigned thereto. The additional code is added to the control code and is outputted from each of the analytical units 11, 12, 13, and 14. The name information indicates the name of the analytical units 11, 12, 13, and 14. The name information includes, for example, text data.

Each of the storage units 111, 121, 131, and 141 is implemented by a memory such as a read-only memory (ROM) or an electrically erasable programmable read-only memory (EEPROM). For example, the control code may be stored in the ROM, and the additional code and the name information may be stored in the EEPROM. As described above, it is preferable that at least the additional code and the name information are stored in a rewritable non-volatile memory such as the EEPROM. In such a case, the additional codes or the name information stored in the storage units 111, 121, 131, and 141 can be rewritten as necessary. The storage units 111, 121, 131, and 141 may have such a configuration that data stored therein can be read by a reader, for example, a configuration of a barcode or an IC tag.

The analysis device 1 is also provided with a controller 15. The controller 15 includes a communication unit 151, a control unit 152, and an ID code generation unit 153. The controller 15 is electrically connected to the analytical units 11, 12, 13, and 14 of the analysis device 1 and the data processing device 2.

The communication unit 151 performs data transmission and reception between the analytical units 11, 12, 13, and 14 and the data processing device 2. The communication unit 151 serves as a first receiving unit for receiving the control code, the additional code, and the name information from each of the analytical units 11, 12, 13, and 14. Note that the data communication by the communication unit 151 is not limited to wired communication, may be wireless communication.

The control unit 152 is configured to include a central processing unit (CPU), for example. The CPU executes programs such as software or firmware to control operation of the analysis device 1. The control unit 152 functions as a first control unit that performs control on the basis of the control code received by the communication unit 151. The control unit 152 does not use, for control, the name information received from each of the analytical units 11, 12, 13, and 14. The name information is sent as-is to the data processing device 2 as described later.

The ID code generation unit 153 generates an ID code on the basis of the control code and the additional code received by the communication unit 151. Stated differently, the ID code generation unit 153 combines the control code and the additional code, which are originally different codes, to generate one code. The ID code generated by the ID code generation unit 153 is sent from the communication unit 151 to the data processing device 2. The ID code generation unit 153 is not necessarily configured separately from the control unit 152. The ID code generation unit 153 may be configured to operate in response to the control unit 152 executing a program.

The data processing device 2 includes a communication unit 21 and a control unit 22. The data processing device 2 is electrically connected to the controller 15. The data processing device 2 is, for example, a chromatography data system (CDS). The data processing device 2 processes data received from the controller 15 to analyze chromatogram data, and so on. The data processing device 2 may be provided with, for example, a display unit for displaying various types of information such as the result of analysis of data, or provided with an operation unit with which a user performs input operation. The data processing device 2 can be implemented by a computer, for example.

The communication unit 21 sends and receives data with the controller 15. The communication unit 21 serves as a second receiving unit for receiving an ID code and name information from the controller 15. Note that the data communication by the communication unit 21 is not limited to wired communication, may be wireless communication.

The control unit 22 is configured to include a CPU, for example. The CPU executes programs such as software or firmware to process the data received from the controller 15. The control unit 22 functions as a second control unit that performs control on the basis of the control code included in the ID code received by the communication unit 21.

2. Specific Example of ID Code

FIG. 2 is a diagram illustrating a specific example of an ID code. In this example, the ID code includes 16-bit data. More specifically, a 12-bit control code is connected to a 4-bit additional code, so that a single 16-bit code is generated as the ID code.

Note that the control code is not limited to the 12-bit control code. The control code may include 11-bit data or less, or may include 13-bit data or more. Similarly, the additional code is not limited to the 4-bit additional code. The additional code may include 3-bit data or less, or may include 5-bit data or more. The ID code is therefore not limited to the 16-bit data.

3. Specific Example of Processing by Data Processing Device

Figure 3:
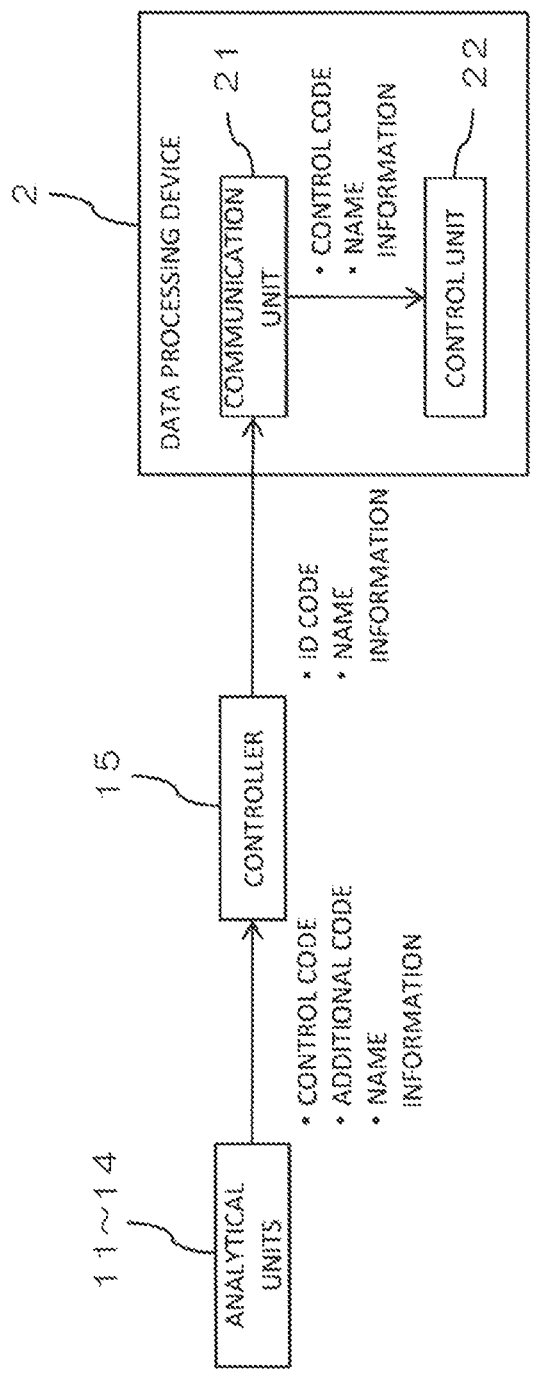
FIG. 3 is a block diagram illustrating a specific example of processing by a data processing device.

FIG. 3 is a block diagram illustrating a specific example of processing by the data processing device 2. The controller 15 receives the control code, the additional code, and the name information from each of the analytical units 11, 12, 13, and 14 to generate an ID code on the basis of the control code and the additional code. The data processing device 2 receives the ID code and the name information through the communication unit 21 from the controller 15.

In the data processing device 2, the control code included in the ID code received from the controller 15 is used for control by the control unit 22; however, the additional code included in the ID code received from the controller 15 is not used for control by the control unit 22. In such a case, the control unit 22 identifies the name of each of the analytical units 11, 12, 13, and 14 on the basis of the name information received from the controller 15. The identified name of each of the analytical units 11, 12, 13, and 14 is used, for example, for display in the display unit of the data processing device 2.

In the example of FIG. 3, the controller 15 receives the control code from each of the analytical units 11, 12, 13, and 14, and performs control on the basis of the control code. The data processing device 2 receives the ID code from the controller 15, and performs control on the basis of the control code included in the ID code. This enables control in the controller 15 and data processing device 2 with the control code separated from the name of each of the analytical units 11, 12, 13, and 14. This can thus avoid the influence on control in the case where the names of the analytical units 11, 12, 13, and 14 are changed.

In particular, in the example of FIG. 3, the data processing device 2 receives, from the controller 15, the name information indicating the name of each of the analytical units 11, 12, 13, and 14. This enables the data processing device 2 to identify the names of the analytical units 11, 12, 13, and 14 on the basis of the name information. In such a case, the data processing device 2 can identify the names of the analytical units 11, 12, 13, and 14 without using the ID code received from the controller 15.

In the case where it is necessary to change not the control code but the name information only because of a change in OEM products or in a part of functions or parts, the entirety of a device ID has been changed in conventional technologies. This requires changing, in the controller, firmware and a table in which device IDs are correlated with model name IDs, which increases man-hours for development. In contrast, according to this embodiment, it is simply required to change the name information (text data), and is not required to change the ID code (control code and additional code). This eliminates the need to change the software or firmware of the controller and the CDS, leading to reduction in man-hours for development. This further eliminates the need of a table in which device IDs of constituent elements are correlated with model name IDs thereof. The table is needed in the controller 15 of the conventional technologies.

4. Modification of Processing by Data Processing Device

Figure 4:
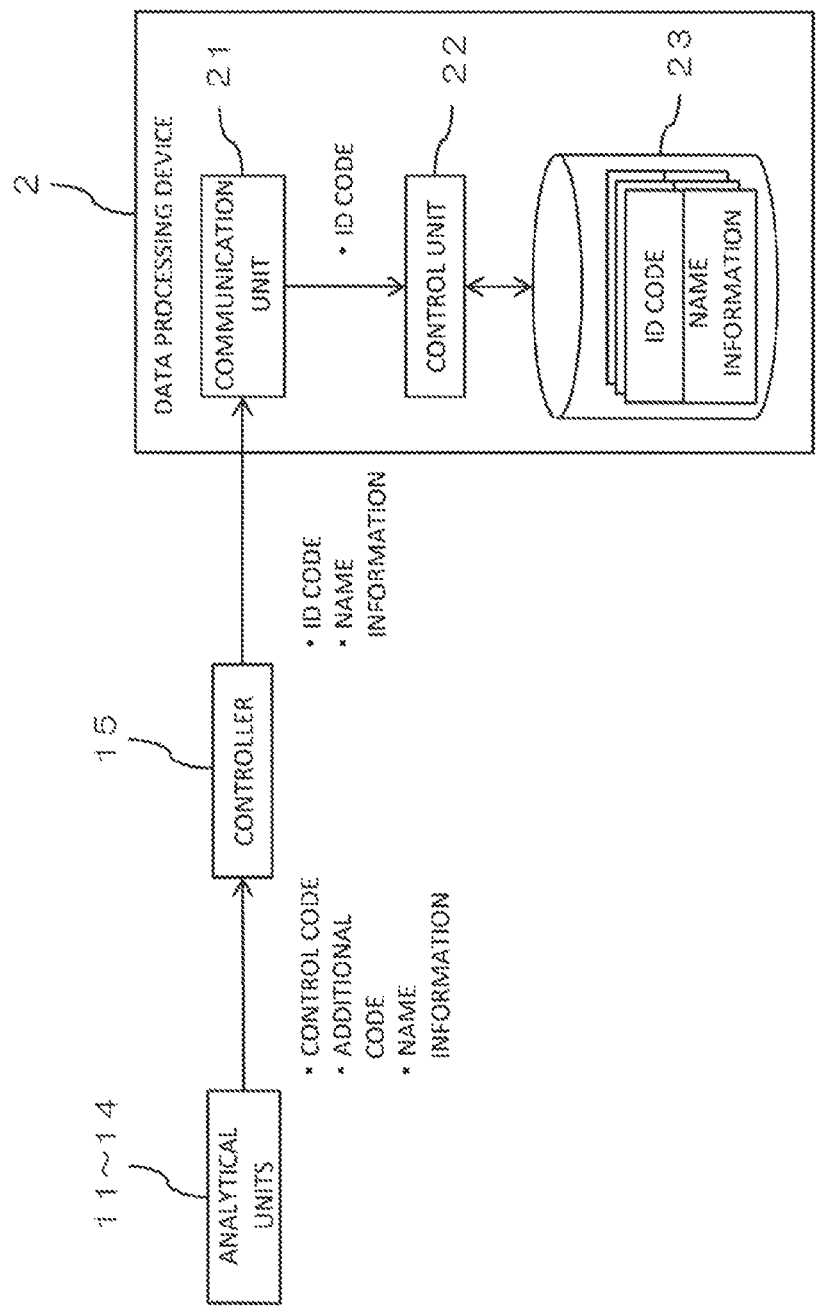
FIG. 4 is a block diagram illustrating a modification of processing by a data processing device

FIG. 4 is a block diagram illustrating a modification of the processing by the data processing device 2. The controller 15 receives the control code, the additional code, and the name information from each of the analytical units 11, 12, 13, and 14 to generate an ID code on the basis of the control code and the additional code. As with the case of FIG. 3, in the modification, the data processing device 2 receives the ID code and the name information through the communication unit 21 from the controller 15.

In the data processing device 2, the control code included in the ID code received from the controller 15 is used for control by the control unit 22, and the names of the analytical units 11, 12, 13, and 14 are identified on the basis of the ID code (control code and additional code). In such a case, the name information received from the controller 15 is not used for the control by the control unit 22.

The data processing device 2 includes a storage unit 23. The storage unit 23 stores, in advance, name information indicating the name of each of the analytical units 11, 12, 13, and 14 in correlation with the ID codes. The storage unit 23 is implemented, for example, by a hard disk drive, and the name information of the analytical units 11, 12, 13, and 14 correlated with the ID codes can be rewritten. The control unit 22 reads out from the storage unit 23, on the basis of an ID code received from the controller 15, the name information corresponding to the ID code. Thereby, the name of the corresponding analytical unit 11, 12, 13, or 14 is identified. The identified name of each of the analytical units 11, 12, 13, and 14 is used, for example, for display in the display unit of the data processing device 2.

As with the case of FIG. 3, in the example of FIG. 4, the controller 15 receives the control code from each of the analytical units 11, 12, 13, and 14, and performs control on the basis of the control code. The data processing device 2 receives the ID code from the controller 15, and performs control on the basis of the control code included in the ID code. This enables control in the controller 15 and data processing device 2 with the control code separated from the name of each of the analytical units 11, 12, 13, and 14. Thus, the influence on control for the case where the names of the analytical units 11, 12, 13, and 14 are changed can be avoided.

In particular, in the example of FIG. 4, the data processing device 2 receives, from the controller 15, the ID code generated by the controller 15, so that the data processing device 2 can identify the names of the analytical units 11, 12, 13, and 14 on the basis of the ID code. The present invention is thus applicable even to the case where the data processing device 2 is a conventional CDS having a device ID and a model name ID uniquely determined. In the case where the names of the analytical units 11, 12, 13, and 14 are changed, it is only required to rewrite the name information, stored in the storage unit 23, on the analytical units 11, 12, 13, and 14 in correlation with the individual ID codes.

5. Other Modification

In the foregoing embodiments, the description is provided of the case where the analysis device 1 is a liquid chromatograph. However, the present invention is not limited to such a configuration, and is also applicable to another analysis device such as a gas chromatograph.

The invention claimed is:

1. An analysis system comprising:
a plurality of constituent elements used for analysis;
a controller configured to perform control on a basis of data received from the constituent elements; and
a data processing device configured to process data received from the controller;
wherein each of the constituent elements includes a storage unit storing a control code used for control, an additional code to be assigned to the constituent element, and name information indicating a name of the constituent element,
the controller includes a first receiving unit configured to receive the control code, the additional code, and the name information from each of the constituent elements, a first control unit configured to perform control on a basis of the control code received by the first receiving unit, and an ID code generation unit configured to generate an ID code on a basis of the control code and the additional code received by the first receiving unit, and
the data processing device includes a second receiving unit configured to receive the ID code and the name information from the controller, and a second control unit configured to perform control on a basis of the control code included in the ID code received by the second receiving unit.

2. The analysis system according to claim 1, wherein the second control unit identifies a name of the constituent element on a basis of the name information received from the controller.

3. The analysis system according to claim 1, wherein the second control unit identifies a name of the constituent element on a basis of the ID code received from the controller.

4. The analysis system according to claim 1, wherein the name information is text data.

\* \* \* \* \*